UNITED STATES PATENT OFFICE.

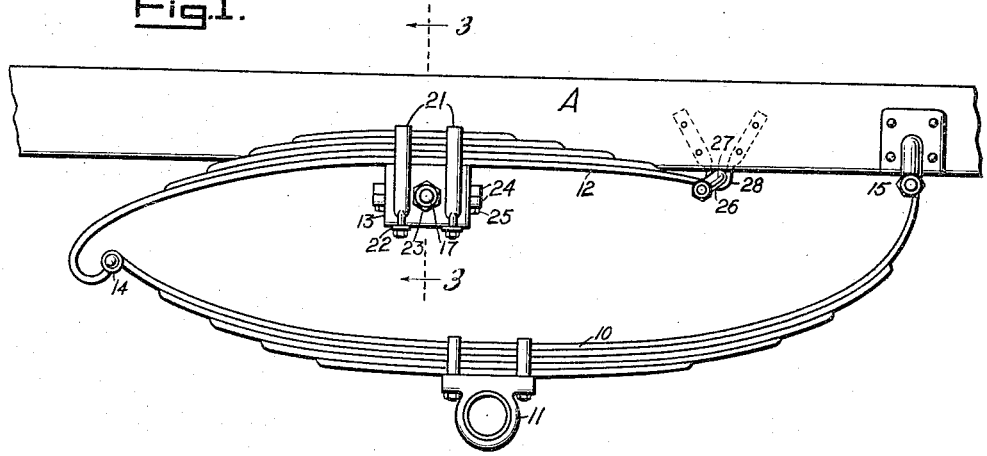

CHARLES FRANCIS HOWELL, OF WATERTOWN, NEW YORK.

VEHICLE-SPRING.

1,209,439.　　　　Specification of Letters Patent.　　Patented Dec. 19, 1916.

Application filed January 8, 1916. Serial No. 70,962.

*To all whom it may concern:*

Be it known that I, CHARLES F. HOWELL, a citizen of the United States, and a resident of Watertown, in the county of Jefferson and State of New York, have invented a new and Improved Vehicle-Spring, of which the following is a full, clear, and exact description.

My invention is intended more particularly for embodiment in the elliptical springs employed on automobiles, and the invention relates especially to the means for mounting the upper sections of the respective side springs on the vehicle frame and connecting them with each other, the purpose of the invention being to equalize the action of the springs at both sides so that a movement of one will result in a corresponding movement of the other.

In carrying out my invention in its preferred form, I employ three quarter scroll elliptic springs at each side of the vehicle, the bottom semi-elliptic spring at each side being mounted on the axle as usual and with one end connected with the chassis, and I so mount the upper semi-elliptic members of the springs, intermediate the ends thereof, on the chassis, as to constitute cantaliver springs; one arm of each cantaliver spring is connected with the remaining arm of the adjacent lower spring member and the opposite arms of the respective cantaliver springs are connected with each other by an equalizer, so that a downward movement of the cantaliver spring at one side will be communicated to the corresponding spring at the other side.

The invention will be particularly explained in the specific description following. Reference is to be had to the accompanying drawings forming a part of this specification in which similar reference characters indicate corresponding parts in all the views.

Figure 1 is a side elevation of a vehicle spring embodying my invention, the view including a portion of a vehicle frame; Fig. 2 is a plan view; and Fig. 3 is a detail in cross section on the line 3—3, Fig. 1.

In carrying out my invention in practice, the lower spring section 10 at each side is secured by any approved means such as a bracket or clip 11 to the vehicle axle (not shown). The upper spring sections at the respective sides of the vehicle are designated by the characters 12, 12', (see Fig. 2). The said upper spring sections 12, 12' of the springs are secured at their approximate centers to the vehicle frame A by upper brackets, designated generally by the numeral 13, the upper and lower section of each spring being connected with each other at one end as at 14, as usual, and each lower spring section having any approved connection, as at 15, with the frame A.

Each support of the upper spring section 12, 12' on the upper bracket 13 is such as to permit a rocking of the respective springs. In the illustrated example, a bearing is provided at each side of the vehicle, there being shown for the purpose, boxes 16 on the frame members A and in said boxes, a cross rod 17 is adapted to turn, the ends of said rod extending beyond the bearings 16 and being squared as at 17$^a$ where they take the castings of the brackets 13. The boxes 16 may be provided with lugs 18, which are secured by bolts 19 to the frame A. Set collars 20 are provided on the rod 17 near the boxes 16 at the inner ends of the latter. The upper section 12 or 12', of each side spring, may be held to the adjacent bracket 13 by any suitable means, such as a strap 21 and a bar-washer 22.

The numeral 23 indicates nuts on the ends of the rod 17. The boxes 16 are shown as formed in sections having flanges 24 united by bolts 25.

At that end of the upper spring sections 12, 12', opposite the connection with the lower spring, said upper springs are secured to the crank arms 26 of a rock bar or shaft 27, which is mounted to turn in suitable bearings 28 on the frame A and constitutes an equalizing connection between the cantaliver ends of the said upper springs 12, 12'.

By the described arrangement the equalizer bar 27 functions, for example, under shocks that do not directly tend to create torque in the central rock bar 17, and also, has an important action when torque is positively created in the said bar 17 by a turning movement of one cantaliver spring 12 or 12' about the axis of said bar. Thus, in case of a shock of a character not tending directly to produce a rocking movement of one cantaliver spring at its central support, as for example, a shock which tends to move one side of the chassis downwardly; this will carry downward the entire cantaliver spring 12 or 12' at that side and tend to carry downward the crank arm 26 of the equalizer bar 27 at that side; but since this cranked equalizer bar is tied to the opposite cantaliver spring, the result is a rocking of the equalizer bar and a distribution of the shock to the said opposite spring. Again, assuming a shock is received on the axle at one end, of a character tending to throw the arm $a$ (see Fig. 2) of spring 12 upwardly, and thus turn the said spring about the axis of the central bar 17, the opposite arm $a'$ of said spring will be rocked downwardly and will act on the crank arm 26 to rock the bar 27. It will be obvious that the movement thus imparted to the spring 12 under the stated conditions is in response to a direct power applied to the axle end of said spring, that is to say, to the arm $a$, while the spring 12', on the other hand, is at this time subject to the torque created in the central bar 17, modified, however, by the fact that the arm $b$ of said spring 12', that is to say, the axle end of said spring, is not a power arm, but on the contrary, is subject to the resistance of the axle at that end of the spring. Therefore, the turning movement of the rock bar 17 does not in this case produce the same movement in the spring 12' that has been produced in the spring 12 by the power directly exerted by the shock on the arm $a$, the corresponding arm $b$ of spring 12' being held by the resistance of the axle instead of being a power arm. The result is that the spring 12', instead of being merely rocked, is distorted, because, while the arm $b$ of spring 12' is resisting the torque created in the central bar 17, the arm $b'$ on said spring is subject to the torque created in the equalizer bar 27 by the arm $a'$ of the spring 12.

Having thus described my invention I claim as new, and desire to secure by Letters Patent:

1. A spring means for vehicles including semi-elliptic spring members, means to mount said members between the ends thereof on a chassis, at opposite sides to constitute cantaliver springs, means to connect one arm of each of said cantaliver springs with the relatively movable running gear of a vehicle, and an equalizer connecting the opposite arms of said cantaliver springs.

2. A vehicle spring means comprising elliptic springs including upper and lower semi-elliptical spring members, means to mount the same between the ends, on an axle, at opposite sides of the vehicle, means to connect one arm of each of said members with the chassis, the opposite arms of each of said members being connected with one end of the adjacent upper spring member, means to mount said upper spring members between the ends thereof, on the chassis, to constitute cantaliver springs, and an equalizing connection between said upper springs at the opposite ends from the connection with the lower spring members.

3. A vehicle spring including separate side springs, a transverse rod, means to rockably mount said rod on a vehicle, means to secure said side springs to the ends of said rod near the center of the said springs, a transverse rock-bar having offset arms thereon to which said springs are connected at one end, means to mount said rock-bar on a vehicle, and means to connect the opposite end of each spring with a relatively movable part of a vehicle.

4. A vehicle spring including separate side springs, means to rockably mount said side springs on a vehicle at about the centers of the springs, means to connect one end of each spring with a relatively movable part of a vehicle, and an equalizer connection extending transversely between the opposite ends of the said springs.

5. A vehicle spring means including separate side springs, means to mount said side springs at about the centers thereof on a vehicle, means to connect said springs at one end with an axle and equalizing means at the opposite ends of the springs, said last-mentioned means consisting of a transverse rockably mounted bar having offset members to which the springs are respectively connected.

6. A vehicle spring means including separate side springs, means to rockably mount said springs on a vehicle, and an equalizing connection between the said springs at one end thereof to cause a movement of one spring to produce a similar movement of the other spring; together with means to effect a connection between the opposite ends of each of said springs and the running gear of a vehicle.

7. A spring means for vehicles including separate side springs, a rod extending transversely between said springs at about the centers thereof, and formed with square portions beneath the springs, brackets clamped to said square portions of the rod and to the said springs, bearings in which said rod is mounted to turn, said bearings having means to secure the same to a vehicle frame, a transverse rock-bar having offset arms at the ends thereof, the adjacent ends of the said springs being secured to said offset arms, and bearings for the said rock bar, adapted to be secured to the vehicle frame.

In testimony whereof I have signed my name to this specification in the presence of two subscribing witnesses.

CHARLES FRANCIS HOWELL.

Witnesses:
F. G. DAVIS,
F. J. SYMONDS.